(12) United States Patent
Lundgren

(10) Patent No.: US 10,724,449 B2
(45) Date of Patent: Jul. 28, 2020

(54) FUEL SYSTEM FOR AN INTERNAL COMBUSTION ENGINE

(71) Applicant: VOLVO TRUCK CORPORATION, Gothenburg (SE)

(72) Inventor: Staffan Lundgren, Hindås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 33 days.

(21) Appl. No.: 16/078,690

(22) PCT Filed: Feb. 26, 2016

(86) PCT No.: PCT/EP2016/054100
§ 371 (c)(1),
(2) Date: Aug. 22, 2018

(87) PCT Pub. No.: WO2017/144116
PCT Pub. Date: Aug. 31, 2017

(65) Prior Publication Data
US 2019/0048808 A1    Feb. 14, 2019

(51) Int. Cl.
*F02B 13/00* (2006.01)
*F02D 19/06* (2006.01)
(Continued)

(52) U.S. Cl.
CPC ..... *F02D 19/0678* (2013.01); *F02D 19/0628* (2013.01); *F02D 19/0665* (2013.01);
(Continued)

(58) Field of Classification Search
CPC ........ F02D 19/00; F02D 19/021; F02D 19/06; F02D 19/0613; F02D 19/0639; F02D 19/066; F02M 37/0064; F02M 37/0088
(Continued)

(56) References Cited

U.S. PATENT DOCUMENTS 6,009,859 A * 1/2000 Roche ................ F02M 25/0872
123/41.31
6,298,833 B1   10/2001 Douville et al.
(Continued)

FOREIGN PATENT DOCUMENTS

CA    2842729 A1   9/2014
EP    2143916 A1   1/2010
(Continued)

OTHER PUBLICATIONS

International Search Report (dated Oct. 17, 2016) for corresponding International App. PCT/EP2016/054100.

*Primary Examiner* — John Kwon
(74) *Attorney, Agent, or Firm* — Venable LLP; Jeffri A. Kaminski

(57) ABSTRACT

A fuel system for an internal combustion engine is provided including a first fuel container for a first fuel, a second fuel container for a second fuel, a pump, and a first fuel injector, the fuel system being arranged to provide a communication between the first fuel container and the pump and between the pump and the first fuel injector, and a reservoir with a separation device adapted to divide the reservoir into a first volume and a second volume, whereby the separation device may be moved or flexed by a pressure difference in the first and second volumes so as to change the sizes of the first and second volumes, wherein the fuel system is arranged to provide a communication between the pump and the first volume, and to provide a communication between the second fuel container and the second volume and between the second volume and a second fuel injector.

17 Claims, 6 Drawing Sheets

(51) Int. Cl.
　　　*F02M 37/04*　　　(2006.01)
　　　*F02D 41/00*　　　(2006.01)
　　　*F02D 41/38*　　　(2006.01)
　　　*F02D 19/08*　　　(2006.01)

(52) U.S. Cl.
　　　CPC ..... *F02D 19/0689* (2013.01); *F02D 19/0692* (2013.01); *F02D 19/08* (2013.01); *F02D 41/0025* (2013.01); *F02D 41/3827* (2013.01); *F02D 41/3845* (2013.01); *F02M 37/04* (2013.01); *F02D 2041/3881* (2013.01); *F02D 2200/0614* (2013.01); *Y02T 10/36* (2013.01)

(58) Field of Classification Search
　　　USPC ................. 123/525, 526, 575–578, 698, 699
　　　See application file for complete search history.

(56) References Cited

U.S. PATENT DOCUMENTS

| | | |
|---|---|---|
| 2013/0087124 A1 | 4/2013 | Kylstrom |
| 2016/0102618 A1* | 4/2016 | Payne ................... F02D 19/081 |
| | | 123/575 |
| 2017/0016794 A1* | 1/2017 | Dudar ................... G01M 3/025 |
| 2018/0105155 A1* | 4/2018 | Wirth ...................... B60T 13/57 |
| 2019/0040777 A1* | 2/2019 | Eriksson ............... F01N 3/0232 |

FOREIGN PATENT DOCUMENTS

| | | |
|---|---|---|
| JP | s57168746 U | 10/1982 |
| WO | 2013087263 A1 | 6/2013 |

* cited by examiner

FUEL SYSTEM FOR AN INTERNAL COMBUSTION ENGINE

BACKGROUND AND SUMMARY

The invention relates to a fuel system for an internal combustion engine, a vehicle with a fuel system, a method of controlling a fuel system, a computer program, a computer readable medium and a control unit.

The invention can be applied in heavy-duty vehicles, such as trucks, buses and construction equipment. Although the invention will be described with respect to a truck, the invention is not restricted to this particular vehicle, but may also be used in other vehicles such as cars.

Dual fuel engines are arranged to be provided with two fuels of different types. Such engines may provide flexibility and a reduced environmental impact. Examples are disclosed in EP2143916A1 and US2013087124A1. In a dual fuel engine it is desirable to keep the complexity and the cost of the fuel system as small as possible. WO2013087263A1 discloses a fuel system with a high pressure pump for a liquid fuel and a gaseous fuel. The access of the fuels to the high pressure pump is controlled with a non-return valve and a switching valve. However, the system in WO2013087263A1 introduces a risk of the fuels of different types mixing in an undesired manner before reaching the combustion chambers of the engine, e.g. since the fuels share a single conduit downstream of the high pressure pump.

A way to avoid in a dual fuel engine the risk of fuels of different types mixing is to provide two complete fuel injection systems with respective injectors, common rails and high pressure pumps. However, thereby a complex and expensive solution is provided.

It is desirable to provide a fuel system for a dual fuel engine in which the risk of fuel of separate types mixing is minimized. It is also desirable to provide a fuel system with a minimized fuel mixing risk, which presents a low complexity and therefore a low cost.

According to an aspect of the invention, a fuel system for an internal combustion engine is provided comprising
a first fuel container for a first fuel, a second fuel container for a second fuel, a pump, and a first fuel injector, the fuel system being arranged to provide a communication between the first fuel container and the pump and between the pump and the first fuel injector,
characterized in that the fuel system further comprises a reservoir with a separation device adapted to divide the reservoir into a first volume and a second volume, whereby the separation device may be moved or flexed by a pressure difference in the first and second volumes so as to change the sizes of the first and second volumes,
wherein the fuel system is arranged to provide a communication between the pump and the first volume, and to provide a communication between the second fuel container and the second volume and between the second volume and a second fuel injector.

It is understood that the first the first fuel container is connected to the pump. The first fuel container may be connected to the pump via a first fuel supply conduit. The pump is suitably arranged to pressurize first fuel from the first fuel container. It is also understood that the pump is connected to the first fuel injector. The pump may be connected to the first fuel injector via a first high pressure conduit. The first fuel injector is suitably adapted to inject the first fuel, pressurized by the pump, to be combusted in the engine. It is further understood that the separation device divides the reservoir into the first volume and the second volume. The pump is connected to the first volume, e.g. via one or more conduits and a first valve arrangement as exemplified below. Also, it is understood that the second fuel container is connected to the second volume, e.g. via a second fuel supply conduit as exemplified below. The second volume is connected to the second fuel injector, e.g. via a second high pressure conduit as exemplified below. The second fuel injector is suitably adapted to inject the second fuel from the second fuel container to be combusted in the engine. Where the engine comprises a plurality of cylinders, first and second common rails may be provided to distribute the first and second fuel, respectively, to a plurality of first and second fuel injectors, respectively, as exemplified below.

The pump may be a high pressure fuel pump. The pump may be of any suitable design, e.g. a piston pump or a rotational pump.

It is understood that by the separation device being moved or flexed the first volume may increase in size while the second volume decreases in size, and vice versa. Thus, since the fuel system is arranged to provide a communication between the pump and the first volume, and to provide a communication between the second fuel container and the second volume and between the second volume and a second fuel injector, the first fuel may be pumped to the first volume and used as a working fluid to move or flex the separation device to pressurize and move the second fuel from the second volume to the second fuel injector.

More specifically, a variation of the pressure in the first volume generated by the pump or by a first valve arrangement as exemplified below, provides for a reciprocal movement of the separation device, it turn generating a pumping action of the reservoir to pump the second fuel from the second fuel container to the second fuel injector. Thereby, the fuel system may provide for a single high pressure fuel pump being used for delivering two fuels to the cylinder(s) of the engine. This is advantageous since high pressure fuel pumps are costly. Also, the reservoir provides for separate conduits for the fuels, upstream as well as downstream of the reservoir. Thereby the fuel system may guarantee that the fuels remain un-mixed and delivered separately to respective injectors, e.g. via respective common rails where the engine is provided with more than one cylinder.

In summary, the first fuel provides, in addition to supporting combustion processes in the cylinders, a function of working fluid for pumping of the second fluid by means of the reservoirs. This means that only one high pressure pump needs to be provided for both fuels. This in turn reduced complexity and cost of the fuel system. In addition, by the reservoirs with the separation devices, a separation of the first and second fuels is secured.

In addition, the invention provides the advantage that since the second fuel does not come into contact with the pump, the fuel type choices for the second fuel does not have to be limited to fuels which exhibit favorable properties for such contact. Thus, it is possible for the second fuel to be a fuel with poor lubrication properties and/or an unfavorable viscosity, which are properties that could damage the pump should the pump be in contact with such a fuel, More specifically, since communications are provided between the first fuel container and the pump, between the pump and the first volume, and between the second fuel container and the second volume, the reservoir provides a pumping function for the second fuel under the action of the first fuel as a work fluid. Thereby, the second fuel is pumped by the reservoir without being in contact with the pump.

Preferably, where the pump presents an inlet and an outlet, the communication between the pump and the first fuel injector being provided between the outlet and the first fuel injector, the communication between the pump and the first volume being providable between the outlet and the first volume. The communication between the first fuel container and the pump may be provided between the first fuel container and the inlet, and the communication between the pump and the first volume may also be providable between the inlet and the first volume. Thereby, the pump inlet may be receive first fuel from the first fuel container as well as from the first volume. Also, the pump outlet may be branched towards the first fuel injector as well as towards the first volume. This provides an advantageous manner of implementing the use of the first fuel as a working fluid for pumping the second fuel by means of the reservoir.

Preferably, where the pump presents an inlet and an outlet, a first valve arrangement being arranged to control the communication between the pump and the first volume alternatingly as a communication between the outlet and the first volume and as a communication between the inlet and the first volume. Thereby, the first valve arrangement may provide an effective manner of controlling the pump action of the reservoir. More specifically, by alternating between the communication between the outlet and the first volume whereby the separation device is moved or flexed so as for the first volume to increase in size, and the communication between the inlet end the first volume whereby the separation device is moved or flexed so as for the first volume to decrease in size, the resulting reciprocal size change of the second volume provides effectively provides the pumping action of the second fuel via the second volume.

Suitably, a second valve arrangement is arranged to, when the separation device is moved or flexed so as for the second volume to increase in size, allow the communication between the second fuel container and the second volume and block the communication between the second volume and the second fuel injector. The second valve arrangement is further preferably arranged to, when the separation device is moved or flexed so as for the second volume to decrease in size, block the communication between the second fuel container and the second volume and allow the communication between the second volume and the second fuel injector. Thereby, the reservoir pumping action of the second fuel from the second fuel container to the second injector will be effectively supported.

In some embodiments, the reservoir presents a first portion, in which the first volume is provided, and a second portion, in which the second volume is provided, wherein the first portion presents a first cross-sectional area and the second portion presents a second cross-sectional area which is different from the first cross-sectional area. Thereby, the separation device may comprise a first separation element in the first portion of the reservoir, and a second separation element in the second portion of the reservoir. The first separation element may be separated from the second separation element by a fluid.

It is understood that the first and second cross-sections are perpendicular to direction of movement or flexing of separation device. Such an arrangement with two different cross-sections of the reservoir provides for delivering the first and second fuels at the first and second injectors, respectively, at different pressures. This is beneficial since in many dual fuel combustion applications, the fuels are suitably provided to the engine at different pressures, e.g. due to different performance or compositions of the fuels and different rolls in the combustion process in the engine.

In addition, separating the first and second separation elements by a fluid provides a leakage buffer which will reduce or eliminate the risk of the first and second fuels mixing. It should be noted that the separation elements may be provided in any suitable form, e.g. as pistons or membranes, as exemplified below. It is also conceivable that one of the separation elements in the reservoir is of one type, e.g. a piston, while the other of the separation elements is of another type, e.g. a membrane.

In preferred embodiments, said reservoir, separation device, first volume and second volume are a primary reservoir, a primary separation device, a primary first volume and a primary second volume, respectively, the fuel system also comprising a secondary reservoir with a secondary separation device adapted to divide the secondary reservoir into a secondary first volume and a secondary second volume, whereby the secondary separation device may be moved or flexed by a pressure difference in the secondary first and second volumes so as to change the sizes of the secondary first and second volumes, wherein the fuel system is arranged to provide a communication between the pump and the secondary first volume, and to provide a communication between the second fuel container and the secondary second volume and between the secondary second volume and the second fuel injector.

Thereby, where the pump presents an inlet and an outlet, a first valve arrangement may be arranged to control the communications between the pump and the primary first volume and the pump and the secondary first volume alternatingly as on one hand a communication between the outlet and the primary first volume and a simultaneous communication between the inlet and the secondary first volume, and on the other hand a communication between the inlet and the primary first volume and a simultaneous communication between the outlet and the secondary first volume. Also, a second valve arrangement may be arranged to, when the primary separation device is moved or flexed so as for the primary second volume to decrease in size and the secondary separation device is moved or flexed so as for the secondary second volume to increase in size, block the communication between the second fuel container and the primary second volume, allow the communication between the primary second volume and the second fuel injector, allow the communication between the second fuel container and the secondary second volume, and block the communication between the secondary second volume and the second fuel injector. The second valve arrangement may be arranged to, when the primary separation device is moved or flexed so as for the primary second volume to increase in size and the secondary separation device is moved or flexed so as for the secondary second volume to decrease in size, allow the communication between the second fuel container and the primary second volume, block the communication between the primary second volume and the second fuel injector, block the communication between the second fuel container and the secondary second volume, and allow the communication between the secondary second volume and the second fuel injector.

By such an arrangement of two reservoirs, second fuel may be pumped to the second injector alternatingly from the primary second volume and the secondary second volume. This provides to a steady flow of second fuel to the second injector, with small or moderate changes in the pressure of in the second injector. In other words, a continuous pump activity is provided due to the alternating feeding of the two reservoirs.

Preferably, where the pump presents an inlet and an outlet, the fuel system further comprises a supply valve being arranged to control the communication between the first fuel container and the pump. Where the communication between the pump and the first volume is providable between the inlet and the first volume, and the pump inlet may receive first fuel from the first fuel container as well as from the first volume, the supply valve may be controlled to secure that the supply of first fuel from the first fuel container is the same as the supply of first fuel to the first injector, and that the amount of first fuel provided to the first volume is the same in each cycle of the reservoir.

According to another aspect of the invention, a method of controlling a fuel system for an internal combustion engine is provided comprising a first fuel container for a first fuel, a second fuel container for a second fuel, a pump presenting an inlet and an outlet, a first fuel injector, a second fuel injector, and a reservoir with a separation device adapted to divide the reservoir into a first volume and a second volume, whereby the separation device may be moved or flexed by a pressure difference in the first and second volumes so as to change the sizes of the first and second volumes, wherein the fuel system is arranged to provide a communication between the first fuel container and the pump, between the pump and the first fuel injector, between the second fuel container and the second volume and between the second volume and the second fuel injector, the method comprising controlling a valve arrangement to allow a communication between the outlet and the first volume, and to block a communication between the inlet and the first volume, receiving a signal indicative of a location or a degree of deflection of the separation device, in dependence on said received signal switching the valve arrangement to block the communication between the outlet and the first volume, and to allow the communication between the inlet and the first volume.

By switching the valve arrangement in dependence on said received signal indicative of the location or a degree of deflection of the separation device, an effective and secure manner is provided for obtaining alternating valve arrangement states, providing for a reciprocal movement of the separation device, it turn generating a pumping action of the reservoir to pump the second fuel from the second fuel container to the second fuel injector. Thereby, the advantages described above of providing for a single pump being used for delivering two fuels to the engine, and keeping the fuels un-mixed, are obtained.

The signal may be received in any suitable manner. Advantageous embodiments includes receiving the signal from an inductive sensor arranged to detect the location or a degree of deflection of the separation device, or providing the signal as representing the pressure between the second volume and the second injector, or in the second injector, as exemplified below.

Advantageously the method may comprise, determining an amount of first fuel supplied to the first injector, and in dependence on the determined amount of first fuel supplied to the first injector, controlling the communication between the first fuel container and the pump so as for an amount of first fuel supplied from the first fuel container to the pump is the same as the determined amount of first fuel supplied to the first injector. Thereby, the supply valve may secure that the supply of first fuel from the first fuel container is the same as the supply of first fuel to the first injector, and that the amount of first fuel provided to the first volume is the same in each cycle of the reservoir.

For example, the received signal may indicate that the separation device has reached an end of its movement, at which end the first volume is at its maximum size. Thereby, when the valve arrangement is switched to allow the communication between the inlet and the first volume, a supply valve may be controlled to block the communication between the first fuel container and the pump inlet. Before the first volume is at its minimum size, the supply valve may be controlled to open the communication between the first fuel container and the pump inlet. Timing of this opening of the supply valve is thereby based on said determined amount of first fuel supplied to the first injector.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
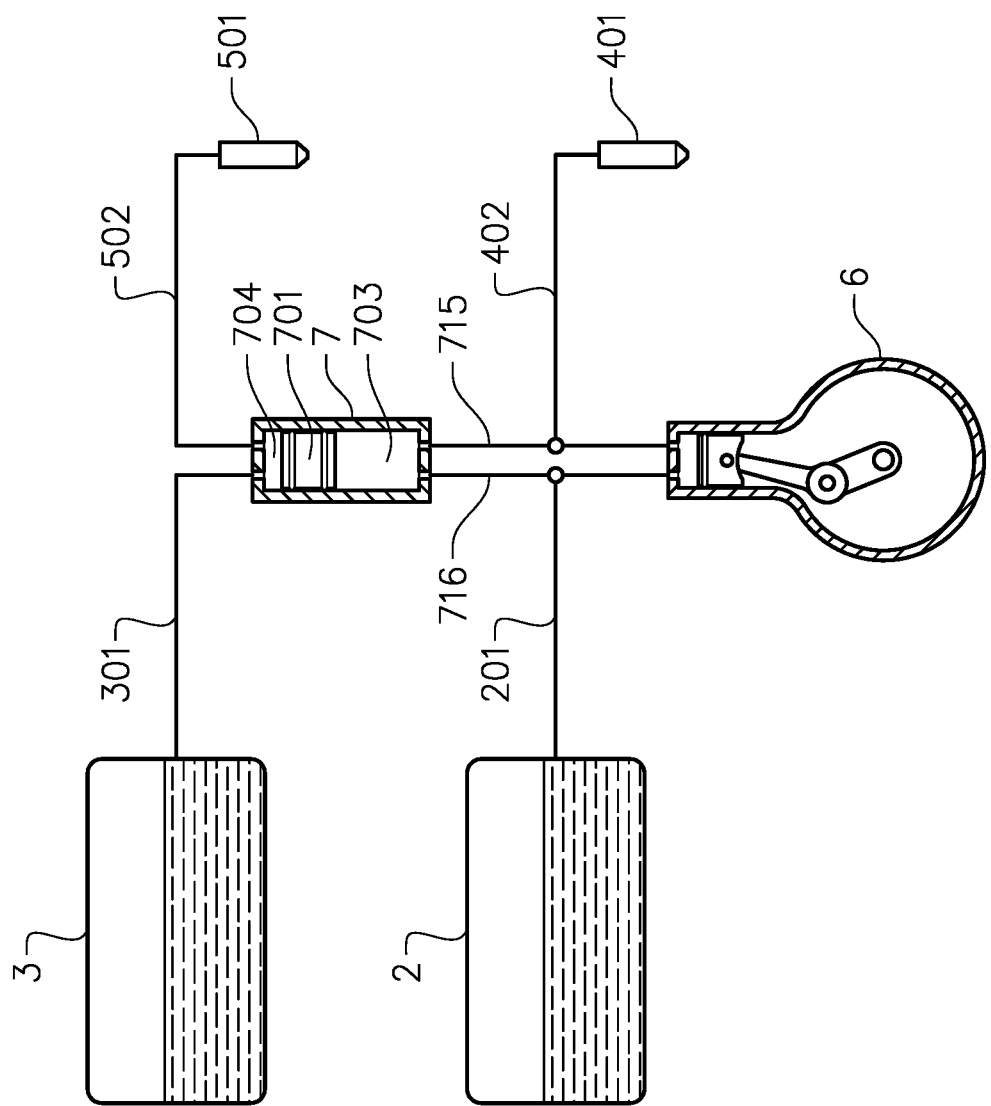
FIG. 1 shows components of a fuel system according to embodiments of the invention.

FIG. 1 shows a schematic layout of a fuel system for presenting the basic principle of embodiments of the invention. The fuel system comprises a first fuel container 2 for a first fuel, a second fuel container 3 for a second fuel, a pump 6, and a first fuel injector 401. The first fuel injector 401 is arranged to inject the first fuel into a cylinder of the engine. The fuel system is arranged to provide a communication between the first fuel container 2 and the pump 6. For this the first fuel container 2 is connected to the pump 6 via a first fuel supply conduit 201. The first fuel supply conduit 201 is connected to the pump 6 at an inlet 601 of the pump 6.

The fuel system is also arranged to provide a communication between the pump 6 and the first fuel injector 401. For this the pump 6 is connected to the first fuel injector 401 via a first high pressure conduit 402. The first high pressure conduit 402 is connected to the pump 6 at an outlet 602 of the pump 6.

The fuel system further comprises a reservoir 7 with a separation device 701 dividing the reservoir 7 into a first volume 703 and a second volume 704. In this example, the reservoir 7 has a cylindrical interior shape, and the separation device 701 is provided in the form of a piston arranged to move along the axis of the cylinder formed by the interior shape of the reservoir 7. Thereby the piston 701 may be moved by a pressure difference in the first and second volumes 703, 704 so as to change the sizes of the first and second volumes 703, 704.

It should be noted that in alternative embodiments, the separation device 701 can be formed by a flexible membrane extending across the interior of the reservoir 7, whereby said interior may present any suitable shape. Such a membrane 701 may divide the reservoir 7 into the first volume 703 and the second volume 704. The membrane 701 may be arranged to flex by a pressure difference in the first and second volumes 703, 704 so as to change the sizes of the first and second volumes 703, 704.

The fuel system is further arranged to provide a communication between the pump 6 and the first volume 703. For this the pump 6 is connected to the first volume 703. More specifically, the pump 6 is connected to the first volume 703 via a delivery conduit 715, and via a return conduit 716. The delivery conduit 715 is connected to the pump 6 at the outlet 602 of the pump 6, and the return conduit 716 is connected to the pump 6 at the inlet 601 of the pump 6.

The fuel system further comprises a second fuel container 3 for a second fuel and a second fuel injector 501. The second fuel injector 501 is arranged to inject the second fuel into the cylinder of the engine into which the first fuel injector 401 is arranged to inject the first fuel. The engine may be provided with one or more cylinders, and the may be provided with common rails for the fuel injection as exemplified below. The fuel system is suitable for a dual fuel combustion process, e.g. where the first fuel is a diesel pilot fuel and the second fuel is dimethyl ether (DME) main fuel. The fuel system is suitable for a dual fuel combustion process, e.g. where the first fuel is e.g. a high cetane fuel such as a diesel pilot fuel, and the second fuel is e.g. a high octane fuel such as e.g. gasoline, ethanol or methanol main fuel. Alternatively the fuel combination may be e.g. methanol and DME, or liquid methane and diesel.

The fuel system is arranged to provide a communication between the second fuel container 3 and the second volume 704. For this the second fuel container 3 is connected to the second volume 704. More specifically, the second fuel container 3 is connected to the second volume 704 via a second fuel supply conduit 301. The fuel system is also arranged to provide a communication between the second volume 704 and the second injector 501. For this the second volume 704 is connected to the second injector 501. More specifically, the second volume 704 is connected to the second injector 501 via a second high pressure conduit 502.

A variation of the pressure in the first volume 703 generated by the pump 6 or by a first valve arrangement as exemplified below, provides for a reciprocal movement of the separation device 701, it turn generating a pumping action of the reservoir 7 to pump the second fuel from the second fuel container 3 to the second fuel injector 501. In some embodiments, where the pump is a piston pump and a valve arrangement as described below is not provided, the pump piston may be timed with the injections of the injectors. Thereby, the fuel system provides for a single pump being used for delivering two fuels to the cylinder(s) of the engine. Also, the reservoir 7 provides for separate conduits for the fuels, upstream as well as downstream of the reservoir 7. Thereby the fuel system may guarantee that the fuels remain un-mixed and delivered separately to respective injectors 401, 501, e.g. via respective common rails where the engine is provided with more than one cylinder.

Figure 2:
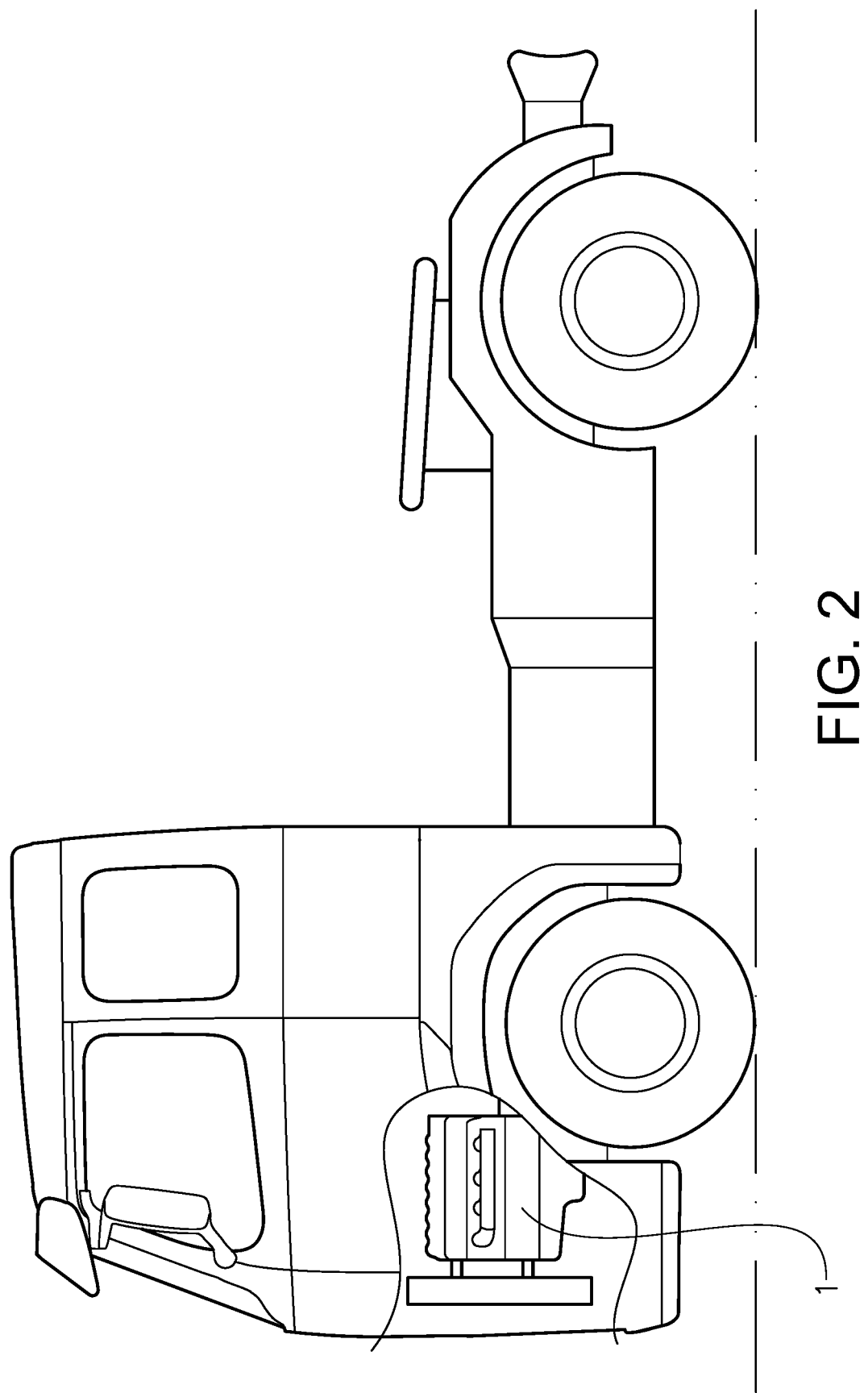
FIG. 2 is a side view of a vehicle in the form of a truck.

FIG. 2 shows a vehicle in the form of a truck, or a tractor for a semitrailer. It should be noted that the vehicle can be of a variety of alternative types, e.g. it may be a car, a bus, or a working machine such as a wheel loader. The vehicle comprises an internal combustion engine 1, which in this example is a four-stroke diesel engine.

Figure 3:
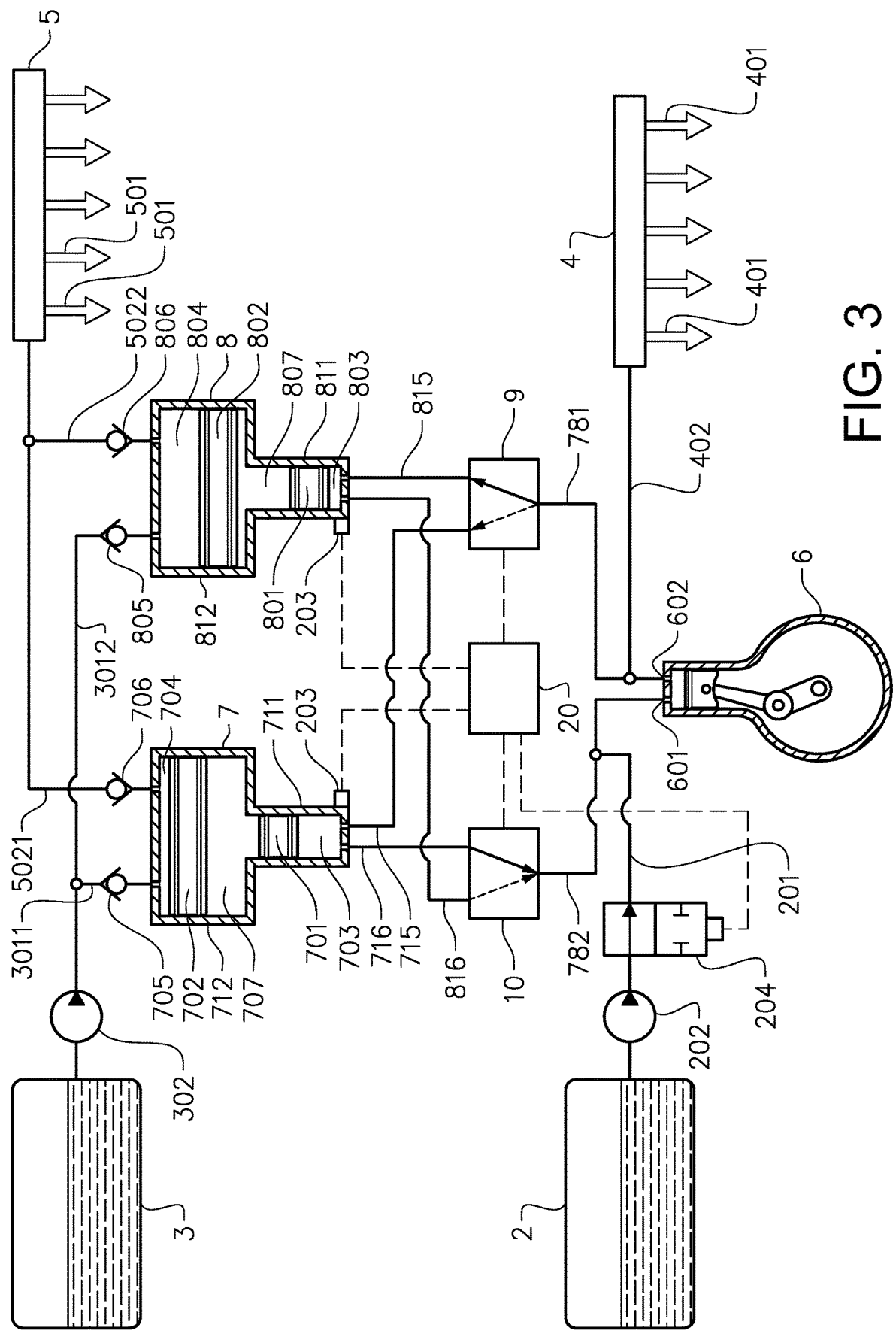
FIG. 3 shows a fuel system in the vehicle in FIG. 2.

Reference is made to FIG. 3 showing parts of a fuel system in the vehicle in FIG. 2. The fuel system for comprises a primary reservoir 7 with a primary separation device comprising two primary separation elements 701, 702 and a secondary reservoir 8 with a secondary separation device comprising two secondary separation elements 801, 802. The primary separation elements 701, 702 divide the primary reservoir 7 into a primary first volume 703 and a primary second volume 704, and the secondary separations devices 801, 802 divide the secondary reservoir 8 into a secondary first volume 803 and a secondary second volume 804.

Each of the reservoirs 7, 8 presents a first portion 711, 811, in which the respective first volume 703, 803 is provided, and a second portion 712, 812, in which the respective second volume 704, 804 is provided. The separation elements 701, 702, 801, 802 are provided in the form of pistons, and comprise a first separation element 701, 801 in the respective first portion 711, 811 of the respective reservoir 7, 8, and a second separation element 702, 802 in the respective second portion 712, 812 of the respective reservoir 7, 8. In each reservoir 7, 8 the first separation element 701, 801 is separated from the second separation element 702, 802 by a fluid 707, 807. The separating fluid 707, 807 may be for example a liquid, e.g. the first fuel or the second fuel, or some other suitable liquid with good high pressure pumping characteristics.

The primary separation elements 701, 702 are movable by a pressure difference in the primary first and second volumes 703, 704 so as to change the sizes of the primary first and second volumes 703, 704. The secondary separation elements 801, 802 are movable by a pressure difference in the secondary first and second volumes 803, 804 so as to change the sizes of the secondary first and second volumes 803, 804. The first portions 711, 811 present a first cross-sectional area and the second portions 712, 812 present a second cross-sectional area which is larger than the first cross-sectional area. It is understood that said cross-sections are perpendicular to direction of movement of separation elements.

By means of the different cross-sections of the first and second portions 711, 811, 712, 813, the pressures in the first and second volumes 703, 803, 704, 804 differ to provide different pressures of the two fuels provided to the engine as described below. Also, the double arrangement of the reservoirs 7, 8 provide for steady pressures of both fuels at the delivery to the engine, as described below.

The fuel system comprises a first fuel container 2 for a first fuel, a second fuel container 3 for a second fuel and a pump 6. The pump 6 is a high pressure pump 6. The pump may be e.g. of a conventional high pressure common rail system type for heavy vehicle diesel engines, is suitably adapted to deliver an injection pressure of up to 2500 bar or more. The pump is suitably designed for high durability. It could comprise e.g. one or more piston rotary pumps or a single piston cam actuated pump-element. The engine in this example has five cylinders (not shown) arranged in an inline formation. The fuel system comprises a first common rail 4 with five first fuel injectors 401 for injecting the first fuel in a respective of the cylinders, and a second common rail 5 with five second fuel injectors 501, for injecting the first fuel in a respective of the cylinders. The fuel injectors 401, 501 are represented by arrows in FIG. 3. Thus it is understood that one first fuel injector 401 and one second fuel injector 501 are arranged at each cylinder.

The first fuel container 2 is connected to the high pressure pump 6 via a first fuel supply conduit 201. A first supply pump 202 is arranged to urge the first fuel from the first fuel container 2 to the high pressure pump 6. The first fuel supply conduit 201 is connected to the high pressure pump 6 at an inlet 601 of the high pressure pump 6. The high pressure pump 6 is connected to the first common rail 4 via a first high pressure conduit 402. The first high pressure conduit 402 is connected to the high pressure pump 6 at an outlet 602 of the high pressure pump 6.

A supply valve 204 is arranged along the first fuel supply conduit 201 to control the communication between the first fuel container 2 and the high pressure pump 6. The supply valve 204 is controllable by a control unit 20.

The high pressure pump 6 is connected to the primary and secondary first volumes 703, 803 in the following manner: A first fuel valve arrangement 9, 10 comprises a first switching valve 9 and a second switching valve 10. The first and second switching valves 9, 10 are controllable by the control unit 20. The high pressure pump 6 is connected to the first switching valve 9 via a common delivery conduit 781. The common delivery conduit 781 is connected to the high pressure pump 6 at the outlet 602 of the high pressure pump 6. The high pressure pump 6 is connected to the second switching valve 10 via a common return conduit 782. The common return conduit 782 is connected to the high pressure pump 6 at the inlet 601 of the high pressure pump 6.

The first switching valve 9 is connected to the primary first volume 703 via a primary delivery conduit 715, and to the secondary first volume 803 via a secondary delivery conduit 815. Thereby the first switching valve 9 may upon control by the control unit 20 selectively allow a communication from the high pressure pump outlet 602 to the primary first volume 703 via the common delivery conduit 781 and the primary delivery conduit 715, and block a communication from the high pressure pump outlet 602 to the secondary first volume 803 via the common delivery conduit 781 and the secondary delivery conduit 815, and vice versa.

The second switching valve 10 is connected to the primary first volume 703 via a primary return conduit 716, and to the secondary first volume 803 via a secondary return conduit 816. Thereby the second switching valve 10 may upon control by the control unit 20 selectively allow a communication from the primary first volume 703 to the high pressure pump inlet 601 via the primary return conduit 716 and the common return conduit 782, and block a communication from the secondary first volume 803 to the high pressure pump inlet 601 via the secondary return conduit 816 and the common return conduit 782, and vice versa.

The second fuel container 3 is connected to the primary second volume 704 via a primary second fuel supply conduit 3011, and to the secondary second volume 804 via a secondary second fuel supply conduit 3012. A second supply pump 302 is arranged to urge the second fuel from the second fuel container 3 to the primary and secondary second volumes 704, 804 via the primary and secondary second fuel supply conduits 3011, 3012, respectively. The primary second volume 704 is connected to the second common rail 5 via a primary second high pressure conduit 5021, and the secondary second volume 804 is connected to the second common rail 5 via a secondary second high pressure conduit 5022.

A second valve arrangement comprises a primary supply non-return valve 705 in the primary second fuel supply conduit 3011, a secondary supply non-return valve 805 in the secondary second fuel supply conduit 3012, a primary delivery non-return valve 706 in the primary second high pressure conduit 5021, and a secondary delivery non-return valve 806 in the secondary second high pressure conduit 5022.

By control by the control unit 20, the first fuel valve arrangement 9, 10 is arranged to assume a first state in which it allows the communication between the high pressure pump outlet 602 and the primary first volume 703, simultaneously blocks the communication between the high pressure pump outlet 601 and the primary first volume 703, simultaneously blocks the communication between the high pressure pump outlet 602 and the secondary first volume 803, and simultaneously allows the communication between the high pressure pump inlet 601 and the secondary first volume 803. Thereby, the two primary separation elements 701, 702 move so as for the primary first volume 703 to increase in size, and the primary second volume 704 to decrease in size. Simultaneously the secondary separation elements 801, 802 move so as for the secondary first volume 803 to decrease in size, and the secondary second volume 804 to increase in size.

By control by the control unit 20, the first and second switching valves 9, 10 may be switched simultaneously to assume a second state, indicated in FIG. 3, in which it blocks the communication between the high pressure pump outlet 602 and the primary first volume 703, simultaneously allows the communication between the high pressure pump outlet 601 and the primary first volume 703, simultaneously allows the communication between the high pressure pump outlet 602 and the secondary first volume 803, and simultaneously blocks the communication between the high pressure pump inlet 601 and the secondary first volume 803. Thereby, the two primary separation elements 701, 702 move so as for the primary first volume 703 to decrease in size, and the primary second volume 704 to increase in size. Simultaneously the secondary separation elements 801, 802 move so as for the secondary first volume 803 to increase in size, and the secondary second volume 804 to decrease in size.

It is understood that the second valve arrangement 705, 706, 805, 806 is arranged to, when the primary second volume 704 decreases in size and the secondary second volume 804 to increases in size, block the primary second fuel supply conduit 3011 and the secondary second high pressure conduit 5022, and allow the second fuel to flow in the secondary second fuel supply conduit 3012 and in the primary second high pressure conduit 5021. Thereby second fuel is pumped from the primary second volume 704 to the second common rail 5, and second fuel is pumped from the second fuel container 3 into the secondary second volume 804.

Conversely, when the primary second volume 704 increases in size and the secondary second volume 804 to decreases in size, the second valve arrangement 705, 706, 805, 806 allows the second fuel to flow in the primary second fuel supply conduit 3011 and in the secondary second high pressure conduit 5022, and blocks the secondary second fuel supply conduit 3012 and the primary second high pressure conduit 5021. Thereby second fuel is pumped from the secondary second volume 804 to the second common rail 5, and second fuel is pumped from the second fuel container 3 into the primary second volume 704.

At each reservoir 7, 8 an inductive sensor 203 is arranged to detect the location of the respective first separation element 701, 801 in the respective first portion 711, 811. The induction sensors 203 are further arranged to send signals to the control unit 20 representing the respective locations of the first separation elements 701, 801. The control unit 20 is arranged to simultaneously switch, based on the signals from the induction sensors 203, the first and second switching valves 9, 10 so as to interchange the first fuel delivery to, and return from, the first volumes 703, 803 as described above. More specifically, such switching is effected when one of the induction sensors 203 indicates that the respective first separation element 701, 801 has reached one of the ends of the reciprocating movement of the respective first separation element 701, 801.

Thus the first fuel valve arrangement 9, 10 is arranged to alternate, by the control by the control unit 20, between the first and second states described above, which in turn provides for second fuel to be pumped to the second common rail 5 alternatingly from the primary second volume 704 and the secondary second volume 804. This provides to a steady flow of second fuel to the second common rail 5, with small or moderate changes in the pressure of in the second common rail 5. For further reduction of pressure fluctuations affecting the injections of the second fuel injectors 501, the control unit 20 could include a logic for making sure the switches of the first fuel valve arrangement 9, 10 between the first and second states do not occur simultaneously with an injection of any of the second fuel injectors. For example, the control unit 20 could be arranged to prioritize avoidance of such a simultaneous second fuel injection and valve arrangement switch, and thereby provide for one or more valve arrangement switches to be offset in time from valve arrangement switching which would otherwise be effected based on the signals from the induction sensors 203.

Figure 4:
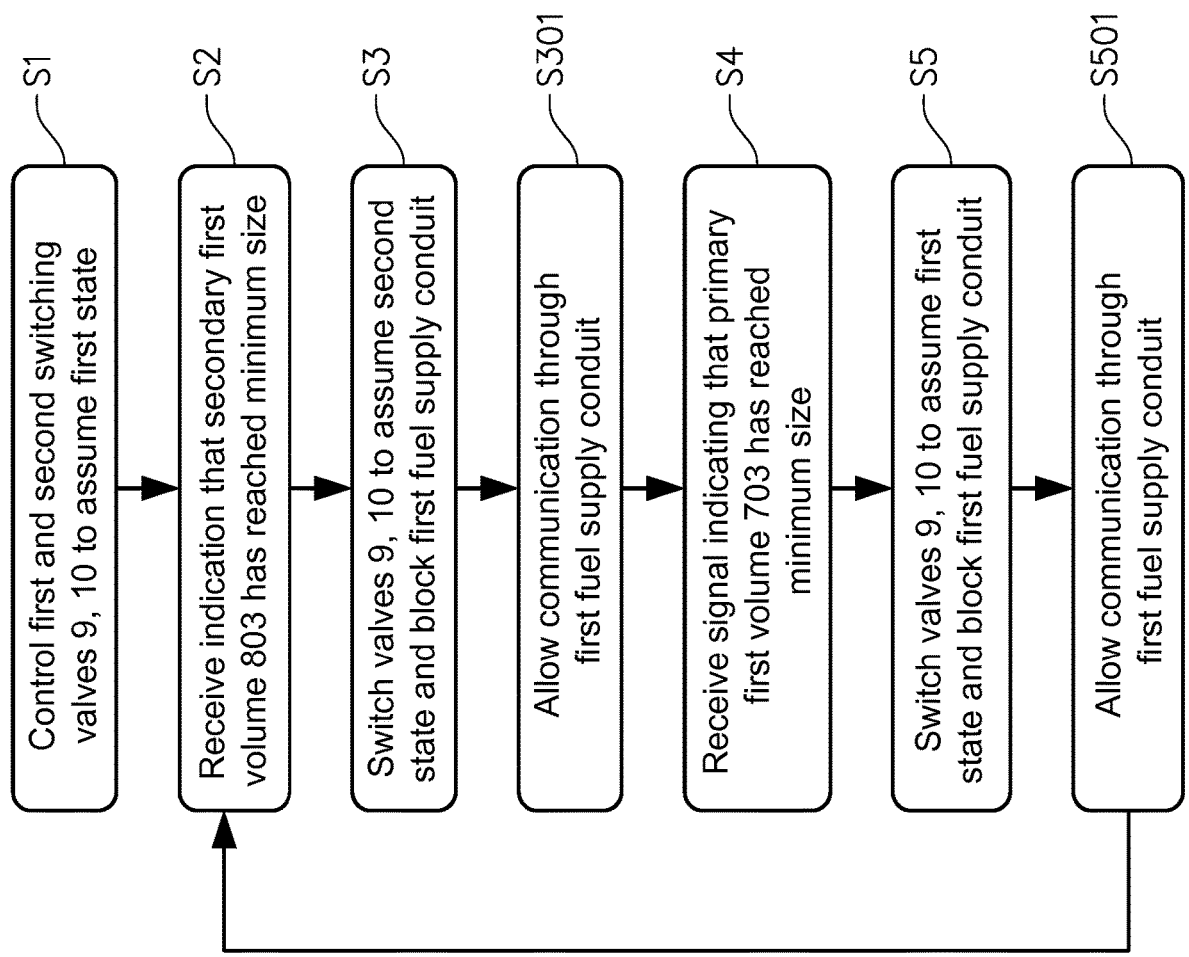
FIG. 4 depicts steps in a method performed in the fuel system in FIG. 3.

With reference to FIG. 4 a method for controlling the fuel system in FIG. 3 will be described. The method comprises controlling the first and second switching valves 9, 10 to assume S1 the first state whereby the two primary separation elements 701, 702 move so as for the primary first volume 703 to increase in size, and the primary second volume 704 to decrease in size, and the secondary separation elements 801, 802 move so as for the secondary first volume 803 to decrease in size, and the secondary second volume 804 to increase in size. Thereby second fuel is pumped from the primary second volume 704 to the second common rail 5, and second fuel is pumped from the second fuel container 3 into the secondary second volume 804.

The method further comprises the control unit 20 receiving S2 a signal from the induction sensor 203 at the secondary reservoir 8 indicating that the secondary first separation element 801 has reached an end of its movement, at which end the secondary first volume 803 is at its minimum size. Upon receiving said signal from the induction sensor 203 at the secondary reservoir 8 the control unit 20 sends signals to the switching valves 9, 10 for the valves to simultaneously switch S3 to assume the second state, indicated in FIG. 3, whereupon, the two primary separation elements 701, 702 move so as for the primary first volume 703 to decrease in size, and the primary second volume 704 to increase in size, and the secondary separation elements 801, 802 move so as for the secondary first volume 803 to increase in size, and the secondary second volume 804 to decrease in size. Thereby second fuel is pumped from the secondary second volume 804 to the second common rail 5, and second fuel is pumped from the second fuel container 3 into the primary second volume 704.

Upon receiving said signal from the induction sensor 203 at the secondary reservoir 8 the control unit 20 also sends a signal to the supply valve 204 so as to block the first fuel supply conduit 201, and thereby block the communication between the first fuel container 2 and the high pressure pump 6.

Subsequently the control unit 20 sends a signal to the supply valve 204 so as to allow S301 communication through the first fuel supply conduit 201, whereby the communication between the first fuel container 2 and the pump 6 is resumed. The timing of this control action depends on a required flow to the first common rail 4. More specifically, the control unit 20 determines an amount of first fuel supplied to the first common rail 4. The determined amount of first fuel supplied to the first common rail 4 may be e.g. a mean flow of first fuel during a predetermined short time interval. Such a flow may be determined e.g. based on opening durations of the first injectors 401 during fuel injections. Alternatively, a mass flow sensor (not shown) may be arranged to provide the control unit 20 with signals indicative of said flow to the first common rail 4.

Said control of the supply valve secures that the supply, e.g. mean flow, of first fuel from the first fuel container 2 is the same as the supply, e.g. mean flow, of first fuel to the first common rail 4, and that the amount of first fuel provided to the first volumes 703, 803 is the same in each cycle of the reservoirs 7, 8.

Thereafter, the control unit 20 receives S4 a signal from the induction sensor 203 at the primary reservoir 7 indicating that the primary first separation element 701 has reached an end of its movement, at which end the primary first volume 703 is at its minimum size. Upon receiving said signal from the induction sensor 203 at the primary reservoir 7 the control unit 20 sends signals to the switching valves 9, 10 for the valves to simultaneously switch S5 to again assume the first state.

Also, upon receiving said signal from the induction sensor 203 at the primary reservoir 7 the control unit 20 again sends a signal to the supply valve 204 so as to block S5 the first fuel supply conduit 201. Subsequently the control unit 20 sends a signal again to the supply valve 204 so as to allow S501 communication through the first fuel supply conduit 201, whereby the communication between the first fuel container 2 and the pump 6 is resumed. As described above, the timing of this control action depends on a required flow to the first common rail 4.

Thus the method involves alternating in the manner described above pumping action stages between the reservoirs 7, 8 by controlling the switching valves 9, 10 to alternatingly assume the first are second states. Also the communication between the first fuel container 2 and the pump inlet 601 is periodically blocked to secure that the amount of first fuel provided to the first volumes 703, 803 is the same in each cycle of the reservoirs 7, 8.

It is understood that by the fuel system and the method described above, the first fuel provides, in addition to supporting combustion processes in the cylinders, a function of working fluid for pumping of the second fluid by means of the reservoirs 7, 8. This means that only one high pressure pump needs to be provided for both fuels. This in turn reduced complexity and cost of the fuel system. In addition, by the reservoirs 7, 8 with the separation elements 701, 702, 801, 802, a separation of the first and second fuels is secured.

Figure 5:
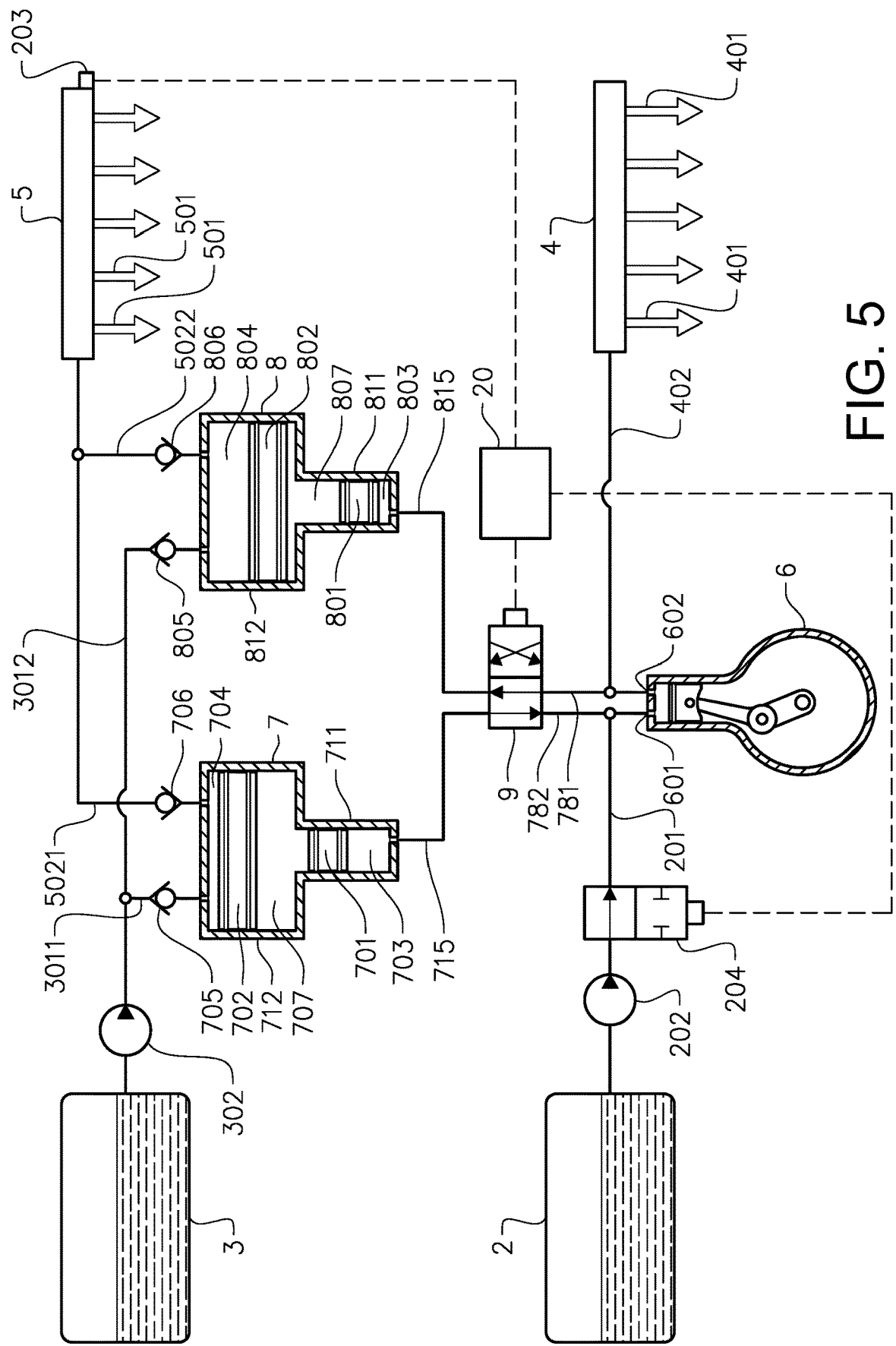
FIG. 5 shows a fuel system according to an alternative embodiment of the invention.

FIG. 5 shows a fuel system according to an alternative embodiment of the invention. The fuel system in FIG. 5 presents identical features to those of the embodiment in FIG. 3, with the exception of the following ones:

Instead of the switching valves 9, 10, a proportional valve 9 is provided. The high pressure pump outlet 602 is connected to the proportional valve 9 via a common delivery conduit 781. The high pressure pump inlet 601 is connected to the proportional valve 9 via a common return conduit 782. A primary delivery and return conduit 715 connects the proportional valve 9 with the primary first volume 703, and a secondary delivery and return conduit 815 connects the proportional valve 9 with the secondary first volume 803.

The proportional valve 9 is controllable by the control unit 20 and is arranged to assume a first state in which the common delivery conduit 781 communicates with the primary delivery and return conduit 715, and the common return conduit 782 communicates with the secondary delivery and return conduit 815, and a second state in which the common return conduit 782 communicates with the primary delivery and return conduit 715, and the common delivery conduit 781 communicates with the secondary delivery and return conduit 815.

Thus, by alternatingly assuming the first and second states, the proportional valve 9 provides reciprocal movements of the separation elements 701, 702, 801, 802 similarly as described with reference to FIG. 3 and FIG. 4, whereby the second fuel is pumped to the second common rail 5 alternatingly from the primary second volume 704 and the secondary second volume 804.

Instead of induction sensors at the reservoirs 7, 8, a pressure sensor 203 is arranged to detect the pressure between the second volumes 704, 804 and the second injectors 501. More specifically, the pressure sensor is arranged to detect the pressure in the second common rail 5. The control unit 20 is arranged to receive signals from the pressure sensor 203. When the separation elements 701, 702, 801, 802 has reached either of the ends of their respective reciprocating movement the pressure detected by the pressure sensor 203 will decrease somewhat.

The control unit 20 is arranged to determine when the detected pressure is below a threshold value. Upon the detection of the detected pressure being below the threshold value, the control unit 20 sends a signal to the proportional valve 9 to change its state from one of the first and second states to the other of the first and second states. Thereby, said alternating pumping of second fuel to the second common rail 5 from the primary second volume 704 and the secondary second volume 804 will be obtained.

Figure 6:
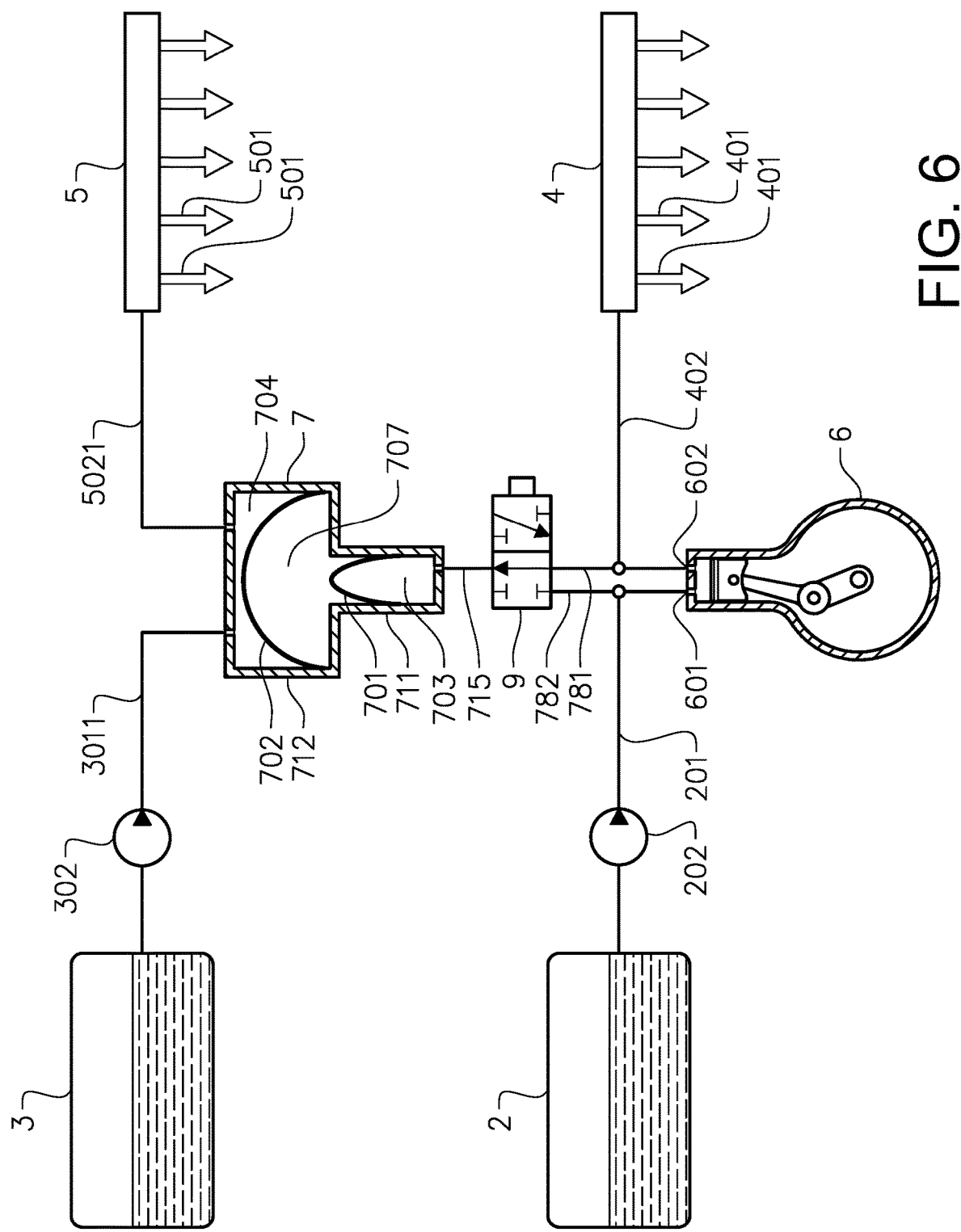
FIG. 6 shows a fuel system according to another embodiment of the invention.

FIG. 6 depicts a fuel system according to a further embodiment of the invention. The embodiment in FIG. 6 has similarities to the embodiment in FIG. 5, but differ therefrom as follows:

A single reservoir 7 is provided. A separation device comprising two separation elements in the form of flexible membranes 701, 702 divide the reservoir 7 into a first volume 703 and a second volume 704. The reservoir presents a first portion 711 in which the first volume 703 is provided, and a second portion 712 in which the second volume 704 is provided. The separation elements 701, 702 comprise a first separation element 701 in the first portion 711, and a second separation element 702 in the second portion 712. The first separation element 701 is separated from the second separation element 702 by a fluid 707, e.g. a liquid. Thus, it is understood that the membranes forming the separation elements 701, 702 are arranged to flex by a pressure difference in the first and second volumes 703, 704 so as to change the sizes of the first and second volumes 703, 704.

Similarly to the embodiment in FIG. 5, in the embodiment in FIG. 6 a proportional valve 9 is provided. The high pressure pump outlet 602 is connected to the proportional valve 9 via a delivery conduit 781, the high pressure pump inlet 601 is connected to the proportional valve 9 via a return conduit 782, and a delivery and return conduit 715 connects the proportional valve 9 with the first volume 703. The proportional valve 9 is arranged to assume a first state in which the delivery conduit 781 communicates with the delivery and return conduit 715, and the return conduit 782 is blocked from the delivery and return conduit 715, and a second state in which the return conduit 782 communicates with the delivery and return conduit 715, and the delivery conduit 781 is blocked from the secondary delivery and return conduit 815.

Thus, by alternatingly assuming the first and second states, the proportional valve 9 provides reciprocal flexing of the separation elements 701, 702, whereby the second fuel is alternatingly pumped from the second fuel container 3 to the second volume 704, and from the second volume 704 to the second common rail 5. It is understood that similarly to the embodiments in FIG. 3 and FIG. 5, a control unit and one or more suitable sensors are provided to control the proportional valve 9 to alternate between the first and second states.

It is to be understood that the present invention is not limited to the embodiments described above and illustrated in the drawings; rather, the skilled person will recognize that many changes and modifications may be made within the scope of the appended claims.

The invention claimed is:

1. A fuel system for an internal combustion engine comprising
a first fuel container for a first fuel, a second fuel container for a second fuel, a pump, and a first fuel injector, the fuel system being arranged to provide a communication between the first fuel container and the pump and between the pump and the first fuel injector,
wherein the fuel system further comprises a reservoir with a separation device adapted to divide the reservoir into a first volume and a second volume, whereby the separation device is moved or flexed by a pressure difference in the first and second volumes so as to change the sizes of the first and second volumes,
wherein the fuel system is arranged to provide a communication between the pump and the first volume, and to provide a communication between the second fuel container and the second volume and between the second volume and a second fuel injector, whereby the fuel system provides for a single fuel pump being used for delivering two fuels of different types to a cylinder of the engine,
wherein the reservoir, separation device, first volume and second volume are a primary reservoir, a primary separation device, a primary first volume and a primary second volume, respectively, the fuel system also comprising a secondary reservoir with a secondary separation device adapted to divide the secondary reservoir into a secondary first volume and a secondary second volume, whereby the secondary separation device is moved or flexed by a pressure difference in the secondary first and second volumes so as to change the sizes of the secondary first and second volumes, wherein the fuel system is arranged to provide a communication between the pump and the secondary first volume, and to provide a communication between the second fuel container and the secondary second volume and between the secondary second volume and the second fuel injector.

2. A fuel system according to claim 1, wherein the pump presents an inlet and an outlet, the communication between the pump and the first fuel injector being provided between the outlet and the first fuel injector, the communication between the pump and the first volume being providable between the outlet and the first volume.

3. A fuel system according to claim 1, wherein the pump presents an inlet and an outlet, the communication between the first fuel container and the pump being provided between the first fuel container and the inlet, the communication between the pump and the first volume being providable between the inlet and the first volume.

4. A fuel system according to claim 1, wherein the pump presents an inlet and an outlet, a first valve arrangement being arranged to control the communication between the pump and the first volume alternatingly as a communication between the outlet and the first volume and as a communication between the inlet and the first volume.

5. A fuel system according to claim 1, wherein a second valve arrangement is arranged to, when the separation device is moved or flexed so as for the second volume to increase in size, allow the communication between the second fuel container and the second volume and block the communication between the second volume and the second fuel injector.

6. A fuel system according to claim 1, wherein a second valve arrangement is arranged to, when the separation device is moved or flexed so as for the second volume to decrease in size, block the communication between the second fuel container and the second volume and allow the communication between the second volume and the second fuel injector.

7. A fuel system according to claim 1, wherein the pump presents an inlet and an outlet, a first valve arrangement being arranged to control the communications between the pump and the primary first volume and the pump and the secondary first volume alternatingly as on one hand a communication between the outlet and the primary first volume and a simultaneous communication between the inlet and the secondary first volume, and on the other hand a communication between the inlet and the primary first volume and a simultaneous communication between the outlet and the secondary first volume.

8. A fuel system according to claim 1, wherein a second valve arrangement is arranged to, when the primary separation device is moved or flexed so as for the primary second volume to decrease in size and the secondary separation device is moved or flexed so as for the secondary second volume to increase in size, block the communication between the second fuel container and the primary second volume, allow the communication between the primary second volume and the second fuel injector, allow the communication between the second fuel container and the secondary second volume, and block the communication between the secondary second volume and the second fuel injector.

9. A fuel system according to claim 1, wherein a second valve arrangement is arranged to, when the primary separation device is moved or flexed so as for the primary second volume to increase in size and the secondary separation device is moved or flexed so as for the secondary second volume to decrease in size, allow the communication between the second fuel container and the primary second volume, block the communication between the primary second volume and the second fuel injector, block the communication between the second fuel container and the secondary second volume, and allow the communication between the secondary second volume and the second fuel injector.

10. A fuel system for an internal combustion engine comprising a first fuel container for a first fuel, a second fuel container for a second fuel, a pump, and a first fuel injector, the fuel system being arranged to provide a communication between the first fuel container and the pump and between the pump and the first fuel injector, wherein the fuel system further comprises a reservoir with a separation device, adapted to divide the reservoir into a first volume and a second volume, whereby the separation device is moved or flexed by a pressure difference in the first and second volumes so as to change the sizes of the first and second volumes, wherein the fuel system is arranged to provide a communication between the pump and the first volume, and to provide a communication between the second fuel container and the second volume and between the second volume and a second fuel injector, whereby the fuel system provides for a single fuel pump being used for delivering two fuels of different types to a cylinder of the engine,
 wherein the reservoir presents a first portion, in which the first volume is provided, and a second portion, in which the second volume is provided, wherein the first portion presents a first cross-sectional area and the second portion presents a second cross-sectional area which is different from the first cross-sectional area, wherein the separation device comprises a first separation element in the first portion of the reservoir and a second separation element in the second portion of the reservoir, wherein the first separation element is separated from the second separation element by a fluid.

11. A fuel system according to claim 1, wherein the pump presents an inlet and an outlet, the fuel system further comprising a supply valve being arranged to control the communication between the first fuel container and the pump.

12. A vehicle with a fuel system according to claim 1.

13. A method of controlling a fuel system for an internal combustion engine comprising
 a first fuel container for a first fuel, a second fuel container for a second fuel, a pump presenting an inlet and an outlet, a first fuel injector, a second fuel injector, and a reservoir with a separation device adapted to divide the reservoir into a first volume and a second volume, whereby the separation device may be moved or flexed by a pressure difference in the first and second volumes so as to change the sizes of the first and second volumes,
 wherein the fuel system is arranged to provide a communication between the first fuel container and the pump, between the pump and the first fuel injector, between the second fuel container and the second volume and between the second volume and the second fuel injector, whereby the fuel system provides for a single fuel pump being used for delivering two fuels of different types to a cylinder of the engine,
 characterized by controlling a valve arrangement to allow a communication between the outlet and the first volume, and to block a communication between the inlet and the first volume,
 receiving a signal indicative of at least one of a location and a degree of deflection of the separation device,
 in dependence on the received signal switching the valve arrangement to block the communication between the outlet and the first volume, and to allow the communication between the inlet and the first volume,
 wherein the signal represents the pressure between the second volume and the second injector, or in the second injector.

14. A method of controlling a fuel system for an internal combustion engine comprising a first fuel container for a first fuel, a second fuel container for a second fuel, a pump presenting an inlet and an outlet, a first fuel injector, a second fuel injector, and a reservoir with a separation device adapted to divide the reservoir into a first volume and a second volume, whereby the separation device is moved or flexed by a pressure difference in the first and second volumes so as to change the sizes of the first and second volumes, wherein the fuel system is arranged to provide a communication between the first fuel container and the pump, between the pump and the first fuel injector, between the second fuel container and the second volume and between the second volume and the second fuel injector, whereby the fuel system provides for a single fuel pump being used for delivering two fuels of different types to a cylinder of the engine, characterized by controlling a valve arrangement to allow a communication between the outlet and the first volume, and to block a communication between the inlet and the first volume, receiving a signal indicative of a location or a degree of deflection of the separation device, in dependence on the received signal switching the valve arrangement to block the communication between the outlet and the first volume, and to allow the communication between the inlet and the first volume, the method further comprising determining an amount of first fuel supplied to the first injector, and independence on the determined amount of first fuel supplied to the first injector, controlling the communication between the first fuel container and the pump so as for an amount of first fuel supplied from the first fuel container to the pump to be the same as the determined amount of first fuel supplied to the first injector.

15. A computer comprising a computer program for performing the steps of claim 13 when the program is run on a computer.

16. A non-transitory computer readable medium carrying a computer program for performing the steps of claim 13 when the program product is run on a computer.

17. A control unit configured to perform the steps of the method according to claim 13.

* * * * *